July 30, 1968  H. R. BEURRIER  3,394,611
OUTPUT CONTROL DEVICE WITH ADJUSTABLE SELF-RETURNING NULL
Filed April 25, 1966  4 Sheets-Sheet 1
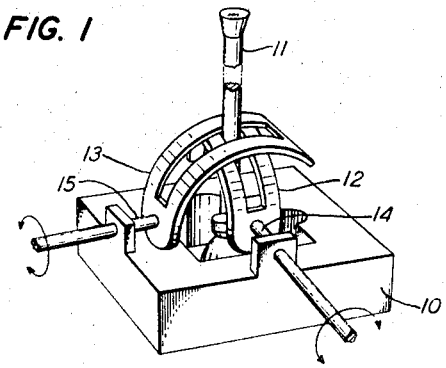
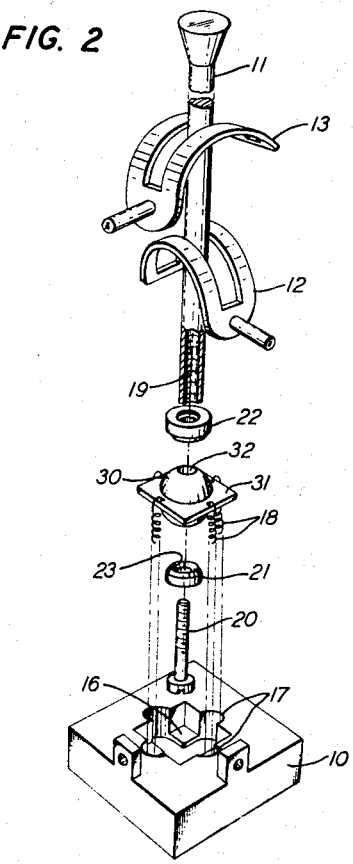
INVENTOR
H.R. BEURRIER
BY
ATTORNEY July 30, 1968  H. R. BEURRIER  3,394,611
OUTPUT CONTROL DEVICE WITH ADJUSTABLE SELF-RETURNING NULL
Filed April 25, 1966  4 Sheets-Sheet 4

United States Patent Office 3,394,611
Patented July 30, 1968

3,394,611
OUTPUT CONTROL DEVICE WITH ADJUSTABLE SELF-RETURNING NULL
Henry R. Beurrier, Chester Township, Morris County, N.J., assignor to Bell Telephone Laboratories, Incorporated, New York, N.Y., a corporation of New York
Filed Apr. 25, 1966, Ser. No. 545,144
5 Claims. (Cl. 74—471)

ABSTRACT OF THE DISCLOSURE

A joy stick with X and Y outputs is frictionally engageable on a rocker which can tilt but is biased into an at-rest position. When the joy stick is engaged and the rocker is at-rest, a first joy-stick null position is defined. New null positions are achieved by disengaging the joy stick and rocker, whereby the rocker either stays in its at-rest position or reverts to it, and then by re-engaging the joy stick and rocker. The rocker can comprise a four-sided plate with its edges spring-biased against corner supports and include a hemispheric center piece which the joy stick selectively engages.

---

This invention concerns control apparatus in which movement of a lever is translated into one or more outputs as for example, X–Y outputs. Particularly, the invention involves means for varying or adjusting the null position of such a lever and for causing the lever to seek to return to any null position to which it is adjusted.

"Joy stick" mechanisms typically consist of a pivoted lever movable in an X direction or in both X and Y directions. A translation device of one sort or another following the lever movement converts it into a mechanical motion or an electrical signal that effects a desired control function. Many schemes are used to return-bias the lever to a set position or "null" within its ambit of movement so that on release it will revert to this null. Lacking in the prior art, however, insofar as applicant is aware, is a means by which the lever null positioin can be adjusted and, notwithstanding its previous bias condition the lever will seek to return to its new null. Such a device, especially an inexpensive one, would find use in any type of slewing control as, for example, radar target tracking, antenna positioning, gun mounts and aircraft control.

Accordingly, a general object of this invention is to extend the usefulness of joy-stick type controls.

A further object of this invention is to make it easier for a slewing device operator to follow a moving object with precision.

A more specific object of the invention is to combine in one inexpensive joy-stick type control both a null-seeking and a quick null-adjusting capability.

In accordance with one embodiment of the invention, a lever having conventional X–Y outputs extends loosely through a relatively large hole in a ball and includes means for releasably clamping to the ball's surface. A flat planar flange is affixed around the ball's approximate midportion, the flange periphery defining, e.g., a triangle or a square. The flange is spring-biased onto a like-shaped shoulder within a recess of a base member. A lever null is defined when, with lever clamped to ball, the flange is flately at rest upon its supporting shoulder. Movement of the lever away from null tilts the ball and plate against the spring force, producing null-seeking pressures on flange and lever. If after the ball and flange are tilted by lever movement away from their last null position the lever is unclamped from the ball, ball and plate revert to their at-rest position under action of the spring. The lever is free to move, or to be reclamped to the ball without movement, or to move and then be reclamped to ball. Its position upon reclamping defines a new lever null. Thereafter, movement away from the new null brings into play the described null-seeking forces which urge the lever to return to its new null.

A feature of the invention, therefore, relates to a joy stick releasably mounted upon a tilting member which is always biased toward or into a neutral position.

Another feature of the invention concerns a push-unlock, release-lock mechanism that enables quick release and engagement of a tiltable ball in which the joy stick is loosely reposed.

In the drawing:

FIG. 1 is a perspective view of a typical type of apparatus to which the present invention is applicable;

FIG. 2 is an assembly drawing in exploded perspective;

FIG. 1 is a joy-stick control device representative of the type of apparatus to which the present invention applies. Shown is a base 10 with a joy stick 11, pivotable in any direction within some defined spherical angle, and a set of slotted forks 12, 13 riding on joy stick 11. Forks 12 and 13 rotate about fixed mutually perpendicular axes 14, 15, respectively. For each setting of joy stick 11, a unique set of rotational angles are assumed by axes 14, 15, representing the desired output.

Figure 3A:
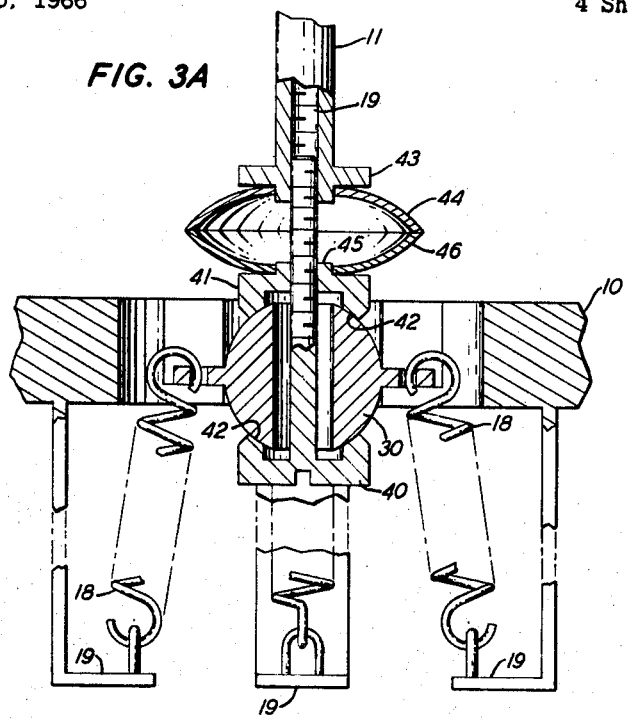
FIGS. 3A through 3D are front views in partial section of a further embodiment of the invention.

The present invention may be incorporated into a device such as shown in FIG. 1 in the manner illustrated in FIG. 2. There, a ball 30 secured around its midportion to a square plate 31 and having a fairly wide bore 32 therein, fits within a recess of base 10. The four corners of plate 31 rest snugly upon four corner shelves 16 within the recess. Four setbacks 17 within the recess, each intermediate two of the corner shelves, accommodate four springs 18 which attach respectively to the sides of plate 31 and as shown in FIG. 3A are anchored in some fashion beneath base 11 at points 19. Plate 31 is free to rock on shelves 16 in any direction but on release will return to its at-rest position on all four shelves 16 under the action of springs 18.

The joy stick 11 shown in the FIG. 2 embodiment includes an internally threaded lower end 19 that receives a stud 20. A pair of clamping cups 21, 22 each have a contoured shoulder 23 with the same curvature as ball 30 upon which they clamp. Each cup 21, 22 has an unthreaded axial bore which loosely receives the shank of a stud 20. When stud 20 is fed through lower cup 21, bore 32 and upper cup 22 and tightened into end 19 of the joy stick 11, the cups are clamped upon ball 30. This secures the joy stick to the ball and plate assembly. Accordingly, the assembly will follow the joy stick movements by rocking upon shelves 16. By twisting the joy stick, the stud 20 is loosened and cups 21, 22 release their grip upon ball 30. If at such point the ball-plate assembly happens to be tilted away from its at-rest position, the action of springs 18 will tend to return it to its at-rest position. Retightening of the joy stick onto the ball now defines for the joy stick a new null position to which it will return under the action of the springs 18 upon plate 31 until the joy stick is again loosened.

It is advantageous to key stud 20 and lower cup 21 to the surface of ball 30 by some conventional means so that the stud 20 cannot turn during adjusting of the null through turning of the joy stick.

Another method of clamping and releasing the ball-plate assembly is illustrated in conjunction with FIGS. 3A–3D, which also show a typical sequence of operations of the instant invention. In FIG. 3A, ball 30 is contacted by an upper clamping cup 41 having a contoured shoulder 42 for contact with the top surface of ball 30. A lower clamping cup is formed by the underside of the head of a stud 40, this underside also having a contoured shoulder 42 that contacts the under surface of ball 30. Stud 40 passes through a wide axial bore in cup 41 and threads into end 19 of joy stick 11. A flange 43 at the lower end of joy stick end 11 provides a seat for a first disk-spring 44; and a flange 45 at the top end of cup 41 provides a seat for a second disk-spring 46. Springs 44, 46 are axially mounted with respect to stud 40, which passes through them; and are opposed so that they urge one another apart when pressed together.

Figure 3B:
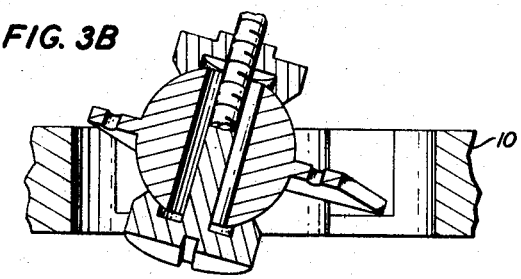
Figure 3C:
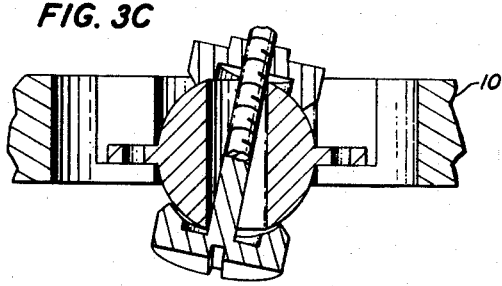
Figure 3D:
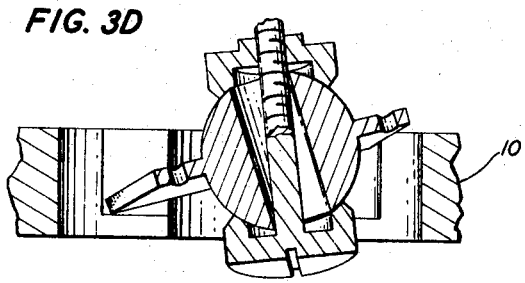

The joy stick is clamped to ball 30 by twisting, which draws up stud 40. At some point springs 44, 46 contact and flex, applying a clamping force to ball 30 through cup 41 and the head underside of stud 40. If now the stick is moved back and to the right into a position such as shown in FIG. 3B, the ball-plate assembly rocks within base 11 also moving back and to the right against the restorative force of springs 18. To disengage the joy stick from ball 30 for purposes of producing a new null position, the joy stick is pressed down. (If the mechanism were that of FIG. 2, the stick would be turned.) This removes the head underside shoulder 42 of stud 40 from the surface of ball 30. The forces of springs 18 are chosen to be sufficient to rotate ball and plate against the frictional force of cup 41 and return the assembly to an at-rest position as shown in FIG. 3C. Release of joy stick 11 restores the clamping pressure to ball 21 and a new joy stick null position is defined. The joy stick 11 and its X–Y outputs, however, are still in the position they were placed when moved back and to the right. Accordingly, this position becomes the new joy stick null in the sense that the joy stick seeks now to return thereto. Thus, movement of joy stick 11 away from this position, e.g., to the far left, will once again rock the ball-plate assembly and set up in springs 18 the return-to-null forces. This time, however, on release the joy stick returns to its new null; and will continue to do so until it is reset as above.

The response of an X–Y output such as in FIG. 1 to the various operations of the joy stick control of FIGS. 3A–3D can be readily visualized. In FIG. 3A, joy stick 11 is so situated, e.g., upright, that the X and Y outputs are zero and the ball-plate assembly is in its at-rest position. This defines a first joy stick null position. When, as in FIG. 3B, the joy stick is moved back and to the right— within its "first quadrant"—and output $X_1$, $Y_1$ is produced. Release of the clamping forces allows the ball-plate assembly to return to its at-rest position, as in FIG. 3C, although the joy stick remains in the position to produce output $X_1$, $Y_1$. The new null for the joy stick is defined and, accordingly, a new null of $X_1$, $Y_1$ for the output is also defined. If the joy stick is now moved to a position back and to the left—within its "second quadrant"—as in FIG. 3D, the output becomes $X_2$, $Y_2$. When the stick is released, it reverts to its newly-established null position, and the output reverts to $X_1$, $Y_1$.

In like fashion, it is possible to set up innumerable new new null positions at will, each corresponding to a unique X–Y output value; and thereafter vary the output until it is desired to return to the latest null. This is accomplished by merely releasing the joy stick.

Figure 4A:
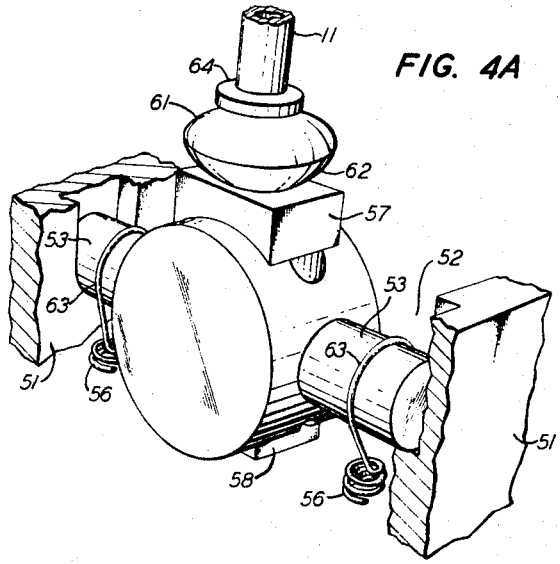
FIG. 4A is a perspective view of a still further embodiment of the invention.
Figure 4C:
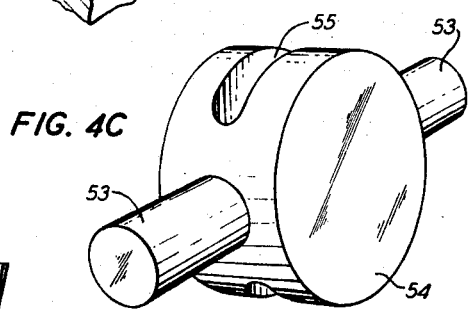
FIG. 4C is a perspective view of the rocking component of the FIG. 4A embodiment.
Figure 4B:
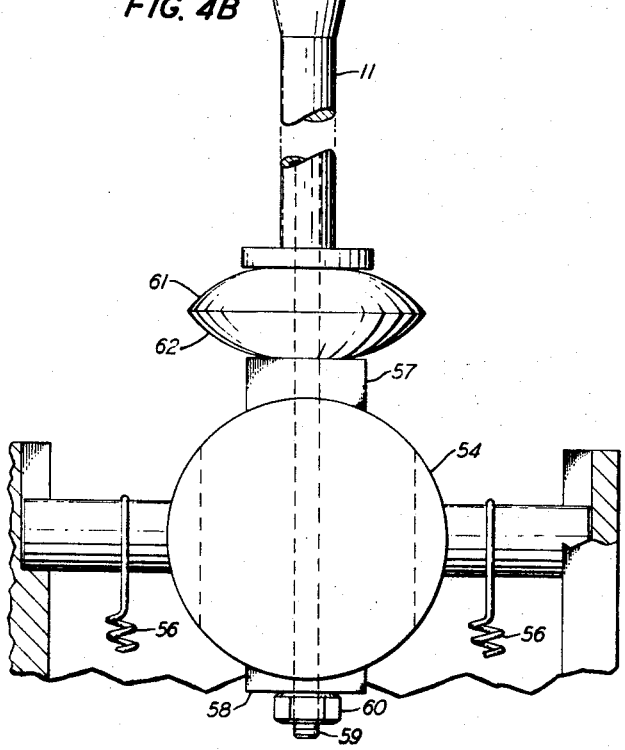
FIG. 4B is a front view in partial section of the embodiment shown in FIG. 4A.

Other variations of the basic inventive scheme are, of course, possible. One, shown in FIGS. 4A–4C, includes an adjustable self-return null on only one axis of an X–Y output device. A base 51 includes an inner recess 52 and pivotable mounting means for a pair of coaxial rods 53. A drum 54 with a wide through-slot 55 is mounted between rods 53. Each end of the rods 53 is biased downwardly by means such as spring 56 pulling on rings 63. A pair of upper and lower clamping saddles 57, 58 grasp the outer surface of drum 54. A stud 59 threaded internally onto joy stick 11 and including a locking nut 60 at its bottom end travels freely in drum slot 55. A pair of disk-springs 61, 62 are placed intermediate upper saddle 57 and a flange 64 of joy stick 11. Tightening of stick 11 and stud 59 secures stick 11 to drum 54 through the action of springs 61, 62. Rotational movement of joy stick 11 about the axis of rods 53 does not produce any set nulls since such movement is not restrained. However, movement about any other axis tilts the rod-drum assembly 53, 54, and 63 against the bias of one of the springs 56, providing the null-return feature. This null is adjustable simply by pressing down upon joy stick 11 and re-orienting the saddles 57, 58 and stud 59 with respect to slot 55.

The shape of the plate on the ball-plate assembly need not be rectangular. If, for example, it was not desirable for the operator to "feel" the X and Y axis, but only to feel that the control lever is at or off the null point, then the plate on the ball-plate assembly could be circular or elliptical rather than square or rectangular. The receptacle would have to be changed accordingly.

Making the plate rectangular or elliptical would permit the lever to move more readily along one axis than the other. Rounding the corners of a square plate, for example, would make it easier to move the control lever into the "corners" where X and Y outputs would be maximum. For a three axis control lever, a triangular plate might be used. Other plate shapes such as circles, ellipses, etc., will also yield useful function in specific instances.

Figure 5C:
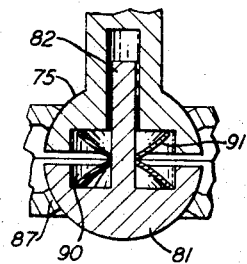
FIGS. 5B and 5C are front sectional views showing variations of the biasing employed in the FIG. 5A embodiment.
Figure 5B:
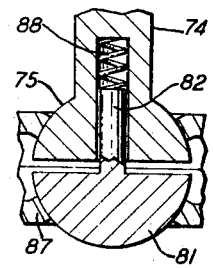
Figure 5A:
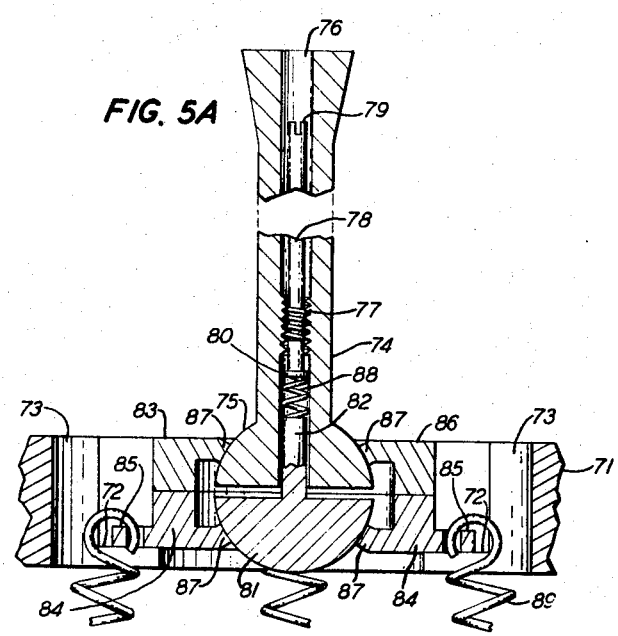
FIG. 5A is a front view in partial section of a third inventive embodiment.

A further embodiment of the inventive concept is illustrated in FIGS. 5A and through 5C. FIG. 5A shows a base 71 with a central recess and including four corner shelves 72 and four recesses 73 between the shelves. Base 71 may be identical to the base 10 seen in FIG. 2. The joy stick 74 comprises a hemispherically shaped lower end 75 and an axial bore 76 with an intermediate threaded portion 77. A rod 78 threads into portion 77 of bore 76 and includes an adjustment slot 79 at the upper end and a plunger 80 at the lower end.

A second hemisphere 81 is positioned beneath hemisphere 75 by means of a central stem 82 slidably retained in the lower end of bore 76. The assembled hemisphere 75, 81 are contained within a two-piece rocker 83 that consists of a lower rocking block 84 with a peripheral square flange 85, and an upper rocking block 86. Three or four arms 87 extend from each of the blocks 84, 86 radially toward the surfaces of hemispheres 75, 81. A helical compression spring 88 placed between plunger 80 and stem 82 biases the hemispheres 75, 81 apart so that the latter normally are firmly contacted by the arms 87 of both lower block 84 and of upper block 86. Four springs 89 attached to the square flange 85 bias rocker 83 normally into an at-rest position upon the shelves 72 of base 71.

A first joy-stick null position may be defined in which joy stick 74 is perpendicularly upright when flange 85 is at-rest on shelves 72. If now joy stick 74 is moved, rocker 83 will tilt and pivot against its shelves in the manner illustrated in FIG. 3B, for example. Both rocker 83 and joy stick 74 which is gripped therein, will be biased by springs 89 back toward the first null position. Depressing joy stick 74 compresses spring 88 and removes hemisphere 75 from contact with the upper block arms 87. This releases rocker 83 which then returns to its at-rest position on shelves 72. If the joy stick is allowed to return from its depressed state, the joy stick hemispheres 75, 81 expand again into contact with arms 87 and joy stick 74 is again locked to rocker 83. This defines a new null position for joy stick 74 to which it will return when moved again.

The apparatus of FIG. 5A is advantageous when a large degree of angular movement is needed for a joy stick.

The null adjustment may be locked out by screwing rod 78 down until spring 88 is fully compressed. Hemispheres 75, 81 therefore are held in contact with the arms 87 of both blocks 84, 86. The lock-out feature also enables the frictional contact force between the arms 87 and the hemispheres 75, 81 to be varied to suit the performance of the operator and to properly balance the forces of springs 89.

If a simpler version of the FIG. 5A embodiment is desired which excludes the lock-out feature, the bore 76 in joy stick 74 may be limited to the bottom portion only with biasing spring 88 fitting between the bottom thereof and the central stem 82 of lower hemisphere 81, as shown in FIG. 5B. A further type of biasing arrangement for the simpler version is shown in FIG. 5C in which the hemispheres 75, 81 have interior recesses 90 that accommodate a set of opposed cup springs 91.

It is to be understood that the above-described arrangements are but illustrative of the application of the principles of the invention. Numerous other arrangements may be devised by those skilled in the art without departing from the spirit and scope of the invention.

What is claimed is:

1. A control device comprising, in combination, a rocker comprising a relatively wide axial passage therethrough, upper and lower surfaces adjacent the ends of said passage, means normal to said passage extending peripherally of said rocker mid-portion; a fixed shelf for flatly supporting said rocker extension means at plural points along the latter's periphery, means for biasing said rocker extension means against said shelf into an at-rest position, a joy stick with one end extending loosely through said rocker passage to allow relative movement between said joy stick and said passage, output means responsive to joy stick movement, and means for releasably clamping said joy stick to said rocker at said upper and lower surfaces, said rocker following said joy stick movement when clamped thereto, and said rocker springing back to its at-rest position when unclamped from said joy stick, whereby the new position of said joy stick with respect to said passage defines a new null position to which said joy stick, after being reclamped to said rocker surfaces and further moved, will return.

2. A control device comprising, in combination, a rocker assembly comprising a spherical member having a relatively wide axial passage and a peripheral flange extending from the midportion of said member normal to said passage, a fixed shelf for flatly supporting said flange, means for biasing said flange against said shelf into an at-rest position, a manually operable joy stick with one end extending loosely through said passage, output means responsive to joy stick movement, and means for releasably engaging said joy stick and said rocker, said spherical member and flange following joy stick movement when engaged therewith, and springing back to said flange at-rest position when disengaged from said joy stick, each engaged position of said joy stick with respect to said passage constituting a null position to which said joy stick will return when released.

3. A control device pursuant to claim 2 wherein said engaging means comprises upper and lower clamping cups contour-fitted to said spherical member, means for affixing said lower cup to said joy stick lower end, means including an intermediate flange on said joy stick for positioning said upper cup axially thereupon, and spring means between said flange and said upper cup for effecting a clamping of said spherical member by said upper and lower cups, whereby depressing of said joy stick releases said lower cup from said spherical member, thereby to disengage same from said joy stick.

4. A control device comprising, in combination, a joy stick including output means; a spherical member comprising a first hemispherical part at one end of said joy stick and a second hemispherical part having a central stem; an axial passage through said joy stick and said first hemispherical part, said stem slidably mounted therein; a receptacle for containing said spherical member and including a flat bottom portion; means for biasing said joy stick and said stem apart; means including said biasing means for effecting engagement between said spherical member and said receptacle; means responsive to depressing of said joy stick for effecting disengagement between said spherical member and said receptacle; a fixed shelf for flatly supporting said receptacle bottom portion; and means for biasing said receptacle against said shelf into an at-rest position, said receptacle following joy stick movement when said spherical member is engaged therewith, and said receptacle springing back to its at-rest position when disengaged from said spherical member, whereby each engaged position of said joy stick with respect to said spherical member constitutes a null position to which said joy stick will return when manually released.

5. A joy-stick mechanism with adjustable null position comprising: a rocker having freedom to tilt along any edge; means for biasing said rocker into a non-tilting at-rest position; a joy stick extending directly into said rocker and including output means responsive to joy-stick movement; means for frictionally engaging said joy stick and said rocker; and means for depressibly disengaging said joy stick and rocker, thereby to allow the rocker to revert to its at-rest position, subsequent reengagement of said joy stick and rocker defining a new joy-stick null position.

References Cited

UNITED STATES PATENTS

| | | | |
|---|---|---|---|
| 2,539,217 | 1/1951 | Willoughby | 74—470 |
| 2,693,372 | 11/1954 | Ludwig | 285—30 |

FRED C. MATTERN, Jr., *Primary Examiner.*

B. T. CALLAHAN, *Assistant Examiner.*